United States Patent [19]

Grebner et al.

[11] Patent Number: 5,368,836
[45] Date of Patent: Nov. 29, 1994

[54] LOW-TEMPLATE CLATHRASIL

[75] Inventors: Michael Grebner, Mainz; Axel Reich, Schornsheim; Horst Reichert; Ferdi Schüth, both of Mainz; Klaus Unger, Seeheim-Jugenheim, all of Germany

[73] Assignee: Merck Patent Gesellschaft mit beschrankter Haftung, Darmstadt, Germany

[21] Appl. No.: 24,967

[22] Filed: Mar. 2, 1993

[30] Foreign Application Priority Data

Mar. 2, 1992 [DE] Germany .............. 4206579

[51] Int. Cl.$^5$ .............................. C01B 33/26
[52] U.S. Cl. .................... 423/706; 423/709; 423/328.3; 423/331; 502/64
[58] Field of Search .............. 502/64; 423/702, 709, 423/704, 328.2, 331, 333

[56] References Cited

U.S. PATENT DOCUMENTS

| | | | |
|---|---|---|---|
| 4,173,622 | 11/1979 | Robertson | 423/789 |
| 4,175,114 | 11/1979 | Plank et al. | 423/329 |
| 4,199,556 | 4/1980 | Plank et al. | 423/329 |
| 4,526,878 | 7/1985 | Takegami et al. | 502/71 |
| 4,562,166 | 12/1985 | Valydcsk | 502/77 |
| 4,665,110 | 5/1987 | Zones | 502/61 |
| 4,714,601 | 12/1987 | Vaughan | 502/62 |
| 5,157,185 | 10/1992 | Chu et al. | 502/71 |

FOREIGN PATENT DOCUMENTS 2935123 4/1981 Germany .

*Primary Examiner*—Anthony McFarlane
*Attorney, Agent, or Firm*—Millen, White, Zelano & Branigan

[57] ABSTRACT

The invention relates to a process for the preparation of low-template clathrasil, comprising heat-treating an alkaline aqueous silicate-containing medium containing crystallization seeds and an amount of a template such that the template content of the clathrasil, relative to the number of moles of the $SiO_2$ of the medium, is less than 2 mol %.

13 Claims, 2 Drawing Sheets

LOW-TEMPLATE CLATHRASIL

BACKGROUND OF THE INVENTION

This application is related to copending application having Ser. No. 08/024962, filed Mar. 2, 1983 now pending.

The invention relates to a low-template clathrasil, a process for its preparation and to the use of this material as an adsorbent.

Clathrasils belong to the class of porous tecto-silicates or porosils, which, according to H. Gies and B. Marler, Zeolites, 12 (1992), 42, can be described by the general formula

$$A^y_{x/y}[^{[4]}Si_{1-x}{}^{[4]}T_xO_{2+z}]uH.vAX.wM \qquad (1)$$

in which A is a cation of charge y, T is a trivalent cation which is coordinated tetrahedrally by 4 O atoms, z is the number of additional O atoms for compensating lattice interruptions, AX are ion pairs and M are guest particles, and u, v and w are 0, 1, 2, with the upper limit being set by the size of the molecules able to be integrated within the structure. Examples of suitable cations A are alkali metal ions and alkaline earth metal ions, T can be, for example, an aluminum cation or boron cation, and, as X, a large number of anions such as, for example, OH, halogen, and the like, are suitable. The guest particles, which are also called templates, are incorporated in the interstices of the porosil structure and thus substantially affect t heir structure during synthesis of the porosils. The guest particles are in general neutral molecules, although, in particular in the case of charged porosil structures, charged guest particles can sometimes also be incorporated. In this case, the above formula (1) has to be modified accordingly, i.e., to $A^y_{x/y-w/Q}$ where W is the number of charged guest molecules and Q is the number of charges.

According to the size and form of the interstices, porosils are divided into clathrasils and zeosils. While zeosils have cage- or channel-like pores whose size is such that the template molecules can be expelled from the pores under relatively mild conditions and, if desired, exchanged for other guest molecules, clathrasils have very small cage-like interstices whose openings are too small for a trapped molecule to leave the pore system. Clathrasils of the dodecasil 1 H, dodecasil 3 C, melanophlogite and nonasil type have pore openings of the less than 3 Å, the pore diameter being typically about 2.8 Å. Such a narrow pore opening allows neither oxygen molecules to enter the pores nor $CO_2$ molecules to leave, so that the template molecules cannot be removed from the pores even by a calcining step.

Hitherto, the clathrasils have been prepared by hydrothermal crystallization at, for example, 200° C. from a silicate-containing solution to which template molecules, such as, for example, adamantylamine are added in excess, as a result of which virtually every sufficiently large interstice in the clathrasil crystals is occupied by a template molecule. The use of such a high template concentration has hitherto in general been considered necessary for obtaining defined and crystalline clathrasil structures of good morphology.

A disadvantage of the preparation processes previously described in the literature are the long synthesis times. Furthermore, in the customary processes, relatively large crystals having a size of between 150 and 500 μm are produced, which is unnecessary or even undesirable for many applications. However, a particular disadvantage is that the clathrasils prepared by customary processes can be regarded as porous materials only to a limited extent, since virtually all available and sufficiently large interstices have already been occupied by template molecules during the synthesis. Since the template molecules can hardly be removed from the interstices, even under drastic conditions, it is virtually impossible to use the previously synthesised clathrasils as adsorbents.

SUMMARY OF THE INVENTION

An object of the present invention was to provide clathrasils and a process for their preparation which does not, or only to a small extent, have the disadvantages of customary clathrasils and customary preparation processes.

It has been found that this object can be achieved by providing a process according to the invention and the clathrasils according to the invention.

Accordingly, the invention relates to a process for the preparation of a low-template clathrasil, characterized in that an alkaline aqueous silicate-containing medium comprising crystallization seeds and such a small amount of template, some of which or all of which may be present in the crystallization seeds, that the template content is less than 1%, relative to the number of moles of $SiO_2$ of the medium, is heat-treated.

Furthermore, the invention relates to low-template clathrasils which are characterized by a template content of less than 1%, relative to the molar $SiO_2$ content of the clathrasil.

Furthermore, the invention relates to the use of the clathrasil according to the invention as an adsorbent for $H_2$, He and/or $NH_3$.

The process according to the invention is suitable for the preparation of various clathrasils, such as, for example, of dodecasil 1 H, dodecasil 3 C, melanophlogite and nonasil. The process is particularly suitable for the preparation of dodecasil 1 H and dodecasil 3 C and in particular of dodecasil 1 H. It has been found that the template concentration during clathrasil synthesis can be drastically reduced by adding crystallization seeds to the alkaline aqueous silicate-containing medium. It is true that the use of crystallization seeds for the synthesis of zeolites is known (see, for example, DE 2,935,123 corresponding to U.S. Pat. Nos. 4,175,114 and 4,199,556), but the synthesis of clathrasils with the addition of crystallisation seeds is not described in the prior art and in particular it has hitherto not been recognized that by the addition of crystallization seeds it is possible to obtain new low-template and highly porous materials which are suitable in particular for use as adsorbents.

The crystallization seeds used are finely milled clathrasil crystals obtained, for example, by customary preparation processes and possibly already containing templates. The clathrasil crystals can be milled, for example, in a vibration mill, and the average particle size of the crystallization seeds obtained is typically between 0.2 and 1.5 μm and in particular about 1 μm.

The amount of crystallization seeds added is less critical and can be between 0.1 and 50% by weight, relative to the $SiO_2$ content of the alkaline aqueous medium; preference is given to a weight proportion of between 2 and 20% by weight.

It has been found that the amount of seed crystal or crystallization seeds added can influence the size of the clathrasil crystals obtained. While an average particles size of between 5 and 15 μm is obtained with relatively small amounts of seed crystals, for example between 5 and 10% by weight of clathrasil crystals, higher seed crystal concentrations of more than 10% by weight and in particular of between 10 and 20% by weight give smaller crystals having an average particle size of typically less than 5 μm.

Seeding of the alkaline aqueous silicate-containing medium by means of crystallization seeds apparently has the effect that the nucleation process is shortened or even skipped, as a result of which it is not necessary to produce a medium favoring nucleation by means of high template excess. The template content, relative to the $SiO_2$ content of the alkaline aqueous medium is less than 2 mol % and in particular less than 1 mol %; in contrast, the template content of customary clathrasils is in general more than 2.5 mol % and, in the case of maximum cage occupation, 2.9 mol %. Particularly preferably, the template content selected is less than 0.5 mol %, in particular not greater than 0.1 mol % and very particularly preferably less than 0.05 mol %. This template content is made up of any template present in the seed crystals and of the template added to the alkaline aqueous medium, it being irrelevant where the template is initially localized. The morphology of the clathrasil crystals obtained can be considered good to very good, and only in the case of very low template concentrations is strong intergrowth of the crystals sometimes observed, which however is immaterial since this material is used as an adsorbent.

The templates used can be various neutral molecules, such as, for example, quaternary ammonium compounds, amines, surfactants, such as, for example, lauryl sulphate, or alcohols. The selection of the seed crystals and/or the selection of the templates determines the crystal structure of the clathrasils obtained after the heat treatment. Clathrasils of the particularly preferred dodecasil 1H structure are obtained especially if 1-adamantylamine, azabicyclononanium iodide and/or piperidine are used as the template. This list is merely intended to illustrate the invention and not to limit it any way; a large number of further molecules are suitable as template molecules, as would be known to one of ordinary skill in the art. The decisive factor is that in the preparation processes according to the invention the demands on the geometry of the template molecules are substantially lower than in the customary processes. In the process according to the invention, the dodecasil 1 H clathrasil structure is obviously mainly induced by the seed crystals, the template molecules having a supporting effect. In contrast, the structure in the customary synthesis is induced and controlled solely the template molecules, as a result of which it is understandable that the template molecule must predetermine the desired geometrical structure as accurately as possible.

It is true that in some cases the use of templates which do not fit exactly in terms of geometry gives intergrown dodecasil 1 H platelets. However, these deviations from perfect morphology are usually only relatively small, and the reaction products obtained can in general be treated by means of an ultrasound treatment without destroying the dodecasil 1 H platelets. The alkaline aqueous medium typically has an $NH_3$ content of 15 to 45 which is equal to the OH content assuming complete dissociation and an $H_2O$ content of 40 to 70, relative to the number of moles of $SiO_2$ of the medium. The required OH content or the corresponding pH is adjusted by adding a base, usually $NH_3$; the pH of the alkaline aqueous medium is preferably between 12 and 13. The ranges given for OH content, $H_2O$ content and pH are in general preferred, values above and below these ranges being however also possible.

The silicate source used can be in particular silica, although aqueous solutions of alkali metal silicates or aluminosilicates or even further silicate sources are also possible.

The alkaline aqueous silicate-containing medium characterized above in more detail is then subjected to a heat treatment, which produces the clathrasil crystals. The heating rate is preferably between 0.05 and 50 K/min and in particular between 0.1 and 20 K/min, and the final temperature selected is preferably between 400 and 470 K and in particular between 423 and 435 K. The temperature can be either increased more or less linearly or alternatively more complicated temperature programs at which the temperature during heating is kept constant, for example, for some time at one or several intermediate values before it is further increased, or else other temperature programmers can be used.

High-template and low-template dodecasil 1 H crystals, i.e. dodecasil 1 H crystals according to the invention, will now be compared, the template used in both cases being 1-adamantylamine. In high-template dodecasil 1 H crystals, the icosahedral cages are more or less completely occupied by 1-adamantylamine. The accessible dodecahedral cages are empty and not occupied by 1-adamantylamine molecules, which are too large for these interstices. However, since the dodecahedral cages are only accessible via the occupied icosahedral cages, the accessible dodecahedral cages—although empty—are not available for sorption.

In contrast, in the case of low-template dodecasil 1 H crystals, many icosahedral cages are unoccupied. However, by virtue of this fact, not only the empty iscoashedral cages but additionally also the accessible dodecahedral cage system are made available for sorption. This effect explains the drastic increase of sorption capacity in the case of low-template dodecasil 1 H crystals compared with high-template dodecasil 1 H crystals, such as shown, for example, in Example 1.

The clathrasil crystals obtained by the process according to the invention are distinguished by very good morphology and by a low template content, the latter resulting in high absorption capacity for small atoms or molecules, in particular for $H_2$, $NH_3$ and/or He. Of these clathrasils according to the invention, those which have an absorption capacity of more than 20 cm$^3$ of He/g of clathrasil (STP) at a temperature of 12 K and a helium pressure of 0.5 bar are particularly preferred.

Owing to their high adsorption capacity for small molecules and atoms, the clathrasils according to the invention are particularly suitable for various applications, such as for the removal of He from natural gas or of $NH_3$ from waste gases. The use of the clathrasils Selection of a suitable temperature program is guided by the idea that the clathrasil synthesis can roughly be divided into two phases, the first of which is nucleation and the second-phase attachment of monomers to a species capable of growth. Thus, if a small or relatively small seed crystal concentration is used, a relatively low heating rate and the use of temperature platforms are often preferred, while in the case of higher seed crystal concentrations it is often possible to heat at a higher rate. Furthermore, at low heating rates, the clathrasil crystals obtained have perfect morphology.

Adjustment of heating rate and heating program to the composition of the alkaline aqueous silicate-containing medium used in each case and optimization with a view to the desired crystal morphology and yield can be easily carried out by one skilled in the art without any inventive step. The total duration of the heat treatment is preferably between 3 and 10 days, the medium being preferably kept at the final temperature for between 3 to 10 days.

The present invention will now be described in somewhat more detail by way of the example of dodecasil 1 H crystals. In dodecasil 1 H, two types of interstices having an interstice opening of 0.28 nm, which are accessible to small molecules such as $H_2$, He and/or $NH_3$, i.e. icosahedral and dodecahedral cages, are present. In addition, a different type of dodecahedral cages exist having such a small interstice opening consisting of an SiO five-membered ring that these interstices are inaccessible to virtually all molecules. These inaccessible dodecahedral cages will not be included in the following discussion. according to the invention as storage medium for $H_2$, for example for traction applications, is particularly preferred.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications, cited above and below, and of corresponding German No. P 42 06 579.8, are hereby incorporated by reference.

EXAMPLES

Example 1

0.8 g of pyrogenic silica having the composition $SiO_2$ was stirred together with 0.08 g of finely milled dodecasil 1 H crystals, which served as seed crystals and are designated hereinafter as $SiO_2$ (seed crystals), and 23.4 ml of 32% by weight ammonia at room temperature for 0.5 min.

Figure 1:
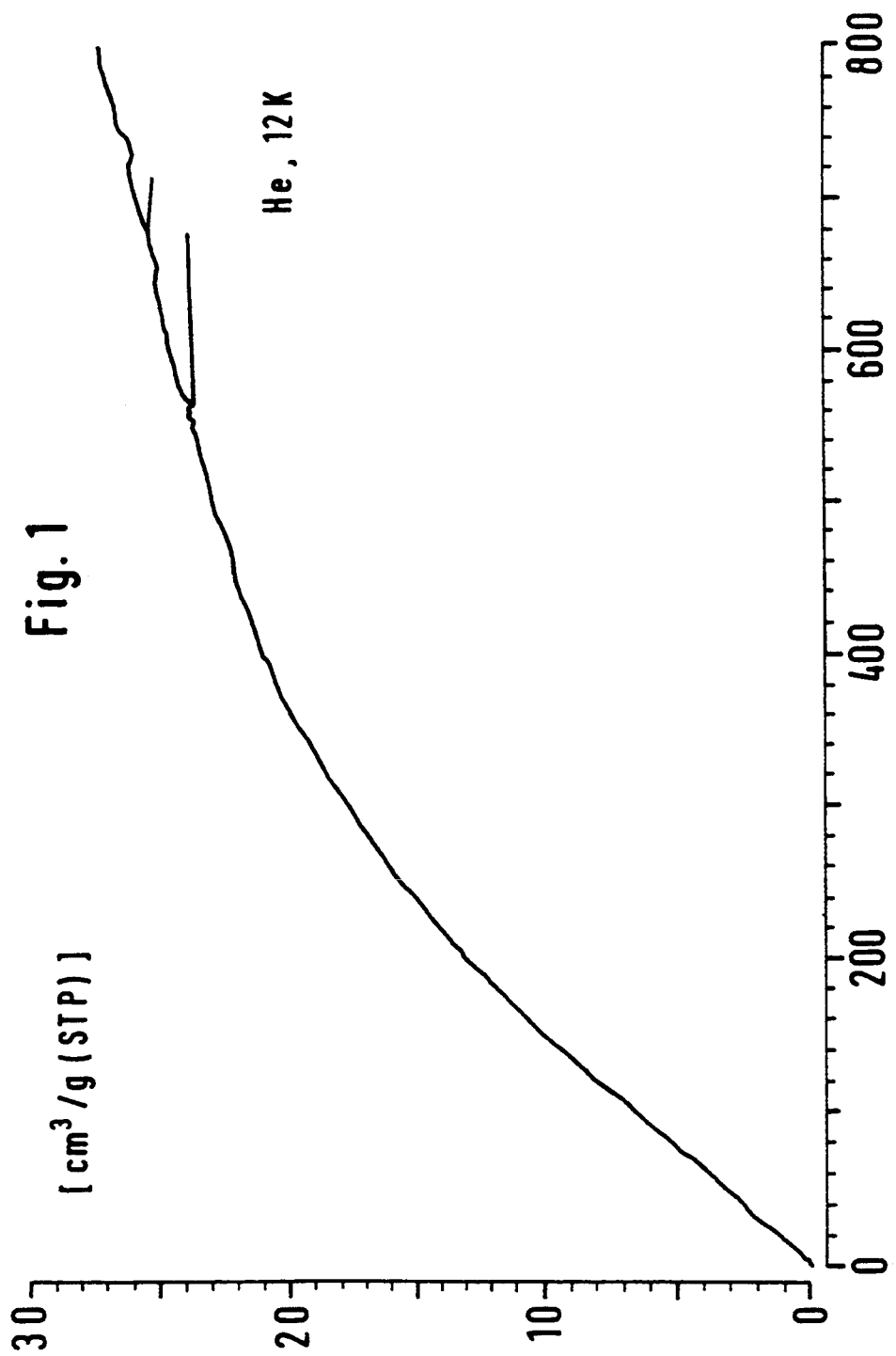
FIG. 1 shows a sorption isotherm for a dodecasil 1H obtained in accordance with Example 1.

The reaction batch had the following molar composition:

1 $SiO_2 \times 0.1$ $SiO_2$ (seed crystals)$\times 0.0029$ 1-adamantylamine (from seed crystals)$\times 60$ $H_2O \times 29$ $NH_3$ At a heating rate of 0.5 K/min and a final temperature of 453 K., dodecasil 1 H was obtained after 144 hours in 100% yield. The dodecasil 1 H obtained had a sorption capacity of 30 ml (STP) of He/g at a temperature of 12 K. FIG. 1 shows the sorption isotherm for this material at 12 K.

For comparison, a high-template dodecasil 1 H was prepared. To this end, 0.8 g of pyrogenic silica having the composition $SiO_2$ was stirred together with 0.08 g of finely milled dodecasil 1 H crystals, which served as seed crystals and are designated hereinafter as $SiO_2$ (seed crystals), and 23.4 ml of 32% by weight ammonia at room temperature for 0.5 min.

Figure 2:
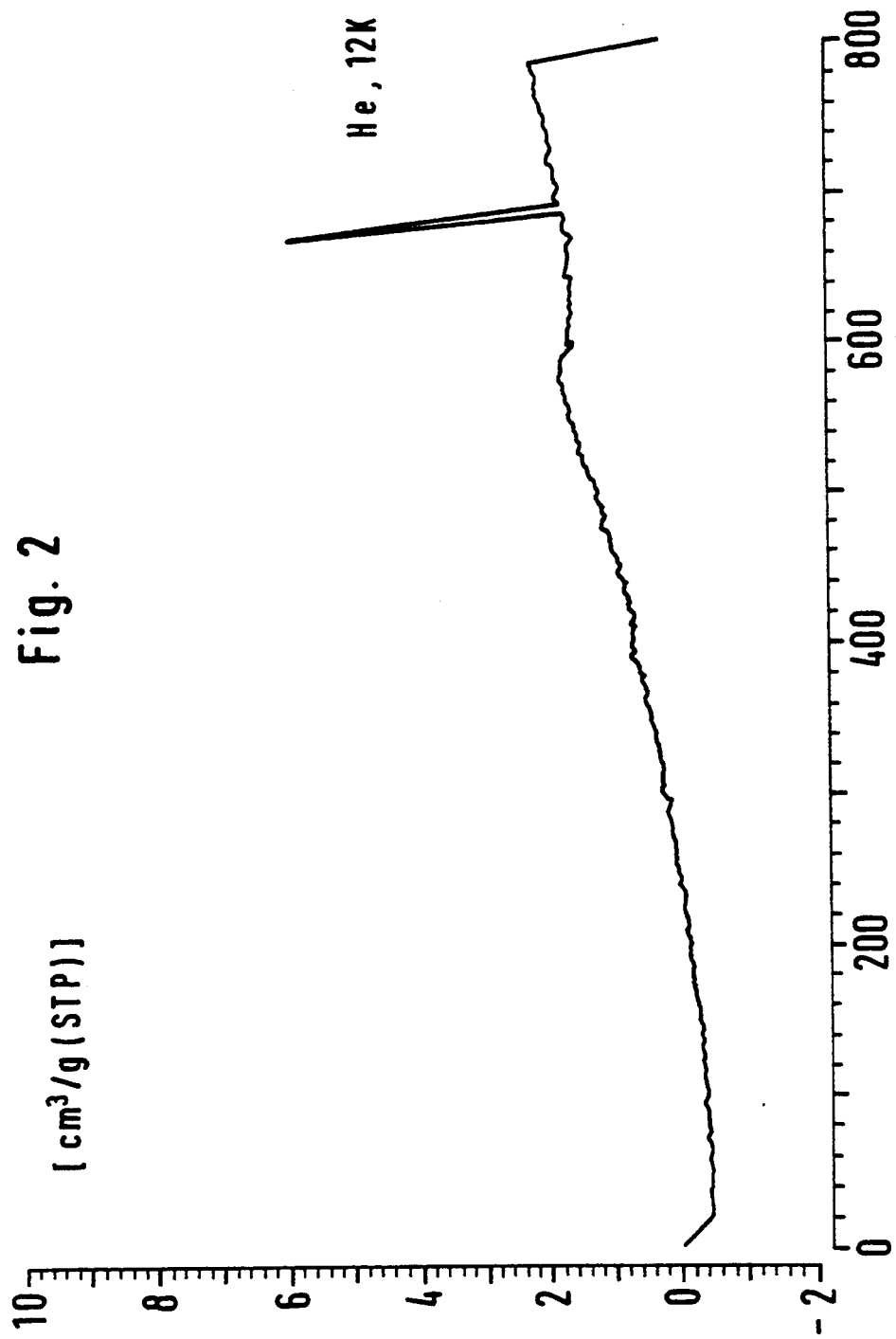
FIG. 2 shows a sorption isotherm for a comparison high-template dodecasil 1H.

The reaction batch had the following molar composition:

1 $SiO_2 \times 0.1$ $SiO_2$ (seed crystals)$\times 0.73$ 1-adamantylamine (from seed crystals)$\times 60$ $H_2O \times 29$ $NH_3$ At a heating rate of 0.5 K/min and a final temperature of 453 K., dodecasil 1 H was obtained after 144 hours in 100% yield. The dodecasil 1 H obtained had a sorption capacity of 2 ml (STP) of He/g at a temperature of 12 K. FIG. 2 shows the sorption isotherm for this material at 12 K.

Example 2

0.8 g of pyrogenic silica having the composition $SiO_2$ was stirred together with 0.08 g of finely milled dodecasil 1 H crystals, which served as seed crystals and are designated hereinafter as $SiO_2$ (seed crystals), 0.01 g of 1-adamantylamine and 23.4 ml of 25% by weight ammonia at room temperature for 0.5 min.

The reaction batch had the following molar composition:

1 $SiO_2 \times 0.1$ $SiO_2$ (seed crystals)$\times 0.0079$ 1-adamantylamine (from addition and seed crystals)$\times 60$ $H_2O \times 22$ $NH_3$ At a heating rate of 0.5 K/min and a final temperature of 453 K., dodecasil 1 H was obtained after 240 hours in 100% yield.

Example 3

0.8 of pyrogenic silica having the composition $SiO_2$ was stirred together with 0.08 g of finely milled dodecasil 1 H crystals, which served as seed crystals and are designated hereinafter as $SiO_2$ (seed crystals), 0.01 g of 1-adamantylamine and 23.4 ml of 47% by weight ammonia at room temperature for 0.5 min.

The reaction batch had the following molar composition:

1 $SiO_2 \times 0.1$ $SiO_2$ (seed crystals)$\times 0.0079$ 1-adamantylamine (from addition and seed crystals)$\times 48$ $H_2O \times 37$ $NH_3$ At a heating rate of 0.5 K/min and a final temperature of 453 K., dodecasil 1 H was obtained after 240 hours in 100% yield.

The preceding examples can be repeated with similar success by substituting the generically or specifically described reactants and/or operating conditions of this invention for those used in the preceding examples.

From the foregoing description, one skilled in the art can easily acertain the essential characteristics of this invention, and without departing from the spirit and scope thereof, can make various changes and modification of the invention to adapt it to various usages and conditions.

What is claimed is:

1. A process for the preparation of a low-template clathrasil, comprising heat-treating an alkaline aqueous silicate-containing medium containing crystallization seeds and an amount of a template such that the template content of the clathrasil, relative to the $SiO_2$ content of the alkaline aqueous medium, is less than 2 mol %, and the clathrasil has an adsorption capacity for He of at least 20 cm$^3$ of He/g of clathrasil at a temperature of 12 K. and an He pressure of 0.5 bar.

2. A process according to claim 1, wherein the crystallization seeds used as finely milled clathrasil crystals.

3. A process according to claim 1, wherein the weight percent of the crystallization seeds, relative to the weight of silica, is 0.05 to 0.2.

4. A process according to claim 1, wherein the template used is 1-adamantylamine, azabicyclononanium iodide, piperidine, or a mixture thereof.

5. A process according to claim 1, wherein the medium is heated at a substantially linear heating rate to a final temperature, said heating rate being 0.1 to 20 K./min, and said final temperature is 400 to 480 K.

6. A low-template clathrasil, obtainable by a process according to claim 1.

7. A low-template clathrasil of claim 6, which has a dodecasil 1 H structure.

8. A low-template clathrasil, obtainable by a process according to claim 1.

9. A low-template clathrasil, having an adsorption capacity for He of at least 20 cm$^3$ of He/g of clathrasil at a temperature of 12 K. and an He pressure of 0.5 bar, obtainable by a process comprising heat-treating an alkaline aqueous silicate-containing medium containing crystallization seeds and an amount of a template such that the template content of the clathrasil, relative to number of moles of the SiO$_2$ content of the alkaline aqueous medium, is less than 2 mol %.

10. A process according to claim 1, wherein the template content is less than 1 mol % relative to the SiO$_2$ content.

11. A low-template clathrasil, obtainable by a process according to claim 10.

12. A process for the preparation of a low-template clathrasil, comprising heat-treating an alkaline aqueous silicate-containing medium containing crystallization seeds and an amount of a template such that the template content of the clathrasil, relative to the number of moles of the SiO$_2$ content of the alkaline aqueous medium, is less than 2 mol %, wherein the template is 1-adamandylamine.

13. A low-template clathrasil, obtainable by a process according to claim 12.

* * * * *